(12) United States Patent
Nykolak et al.

(10) Patent No.: US 11,251,873 B2
(45) Date of Patent: *Feb. 15, 2022

(54) MITIGATION OF ATMOSPHERIC SCINTILLATION FOR COMMUNICATION

(71) Applicant: CACI, Inc.—Federal, Arlington, VA (US)

(72) Inventors: Gerald Nykolak, Long Beach, NY (US); David C. Nielsen, Bridgewater, NJ (US); Andrew Russell Grant, Freehold, NJ (US)

(73) Assignee: CACI, Inc.—Federal, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/178,309

(22) Filed: Feb. 18, 2021

(65) Prior Publication Data
US 2021/0175975 A1 Jun. 10, 2021

Related U.S. Application Data

(63) Continuation of application No. 16/714,021, filed on Dec. 13, 2019, now Pat. No. 10,958,351.

(60) Provisional application No. 62/808,417, filed on Feb. 21, 2019.

(51) Int. Cl.
| | |
|---|---|
| *H04B 10/50* | (2013.01) |
| *H04L 1/20* | (2006.01) |
| *H04B 10/118* | (2013.01) |
| *H04L 1/00* | (2006.01) |

(52) U.S. Cl.
CPC ......... *H04B 10/504* (2013.01); *H04B 10/118* (2013.01); *H04L 1/0041* (2013.01); *H04L 1/20* (2013.01)

(58) Field of Classification Search
None
See application file for complete search history.

(56) References Cited

U.S. PATENT DOCUMENTS

| | | | |
|---|---|---|---|
| 4,201,961 A * | 5/1980 | Klein | H01P 1/174 333/21 A |
| 4,697,284 A | 9/1987 | Glance | |
| 7,106,971 B1 * | 9/2006 | Davis | H04B 10/112 398/121 |
| 10,958,351 B2 * | 3/2021 | Nykolak | H04B 10/516 |
| 2004/0013430 A1 | 1/2004 | Asami et al. | |
| 2004/0208646 A1 | 10/2004 | Choudhary et al. | |
| 2010/0173667 A1 | 7/2010 | Hui et al. | |
| 2013/0182620 A1 | 7/2013 | Chaffee et al. | |
| 2014/0355446 A1 | 12/2014 | Altman | |
| 2015/0288542 A1 | 10/2015 | Ashrafi et al. | |
| 2016/0204866 A1 | 7/2016 | Boroson et al. | |

\* cited by examiner

*Primary Examiner* — David W Lambert
(74) *Attorney, Agent, or Firm* — BakerHostetler

(57) ABSTRACT

The present application is directed to an optical terminal including two linearly polarized optical transmit beams configured to exhibit a time-delay therebetween. The optical terminal may include a quarter-wave plate such that the linearly polarized transmit beam becomes circularly polarized. The optical terminal may also include a receiving ground terminal including a properly oriented quarter-wave plate for separating and directing the two recovered linearly polarized beams. The application is also directed to a method for reconstructing an originally transmitted data stream.

20 Claims, 8 Drawing Sheets

MITIGATION OF ATMOSPHERIC SCINTILLATION FOR COMMUNICATION

CROSS-REFERENCE TO RELATED APPLICATIONS

This application is a continuation of U.S. patent application Ser. No. 16/714,021, filed Dec. 13, 2019, which claims the benefit of U.S. Provisional Patent Application No. 62/808,417, filed Feb. 21, 2019, the entire disclosures of both of which are hereby incorporated by reference as if set forth in their entirety herein.

BACKGROUND

Over the last decade, existing optical terminals exhibit excessive power consumption and/or are large designs.

What is desired in the art is a compact/small, light-weight, and low-power consuming (SWAP) optical terminal for DTE transmission.

What is also desired in the art is a low earth orbit (LEO) optical terminal suitable for LEO-to-ground (LEOG) transmission.

What is further desired in the art is optical terminal configured to mitigate scintillation impairments resulting from free space atmospheric propagation.

SUMMARY

The foregoing needs are met, to a great extent, by the present disclosure, including an improved optical terminal and methods of using the same.

One aspect of the application is directed to an optical terminal including two linearly polarized optical transmit beams configured to exhibit a time-delay therebetween. In an embodiment, the two transmit beams exhibit the same data. The optical terminal can comprise a quarter-wave plate such that the linearly polarized transmit beam becomes circularly polarized. The optical terminal may also comprise a receiving ground terminal including a properly oriented quarter-wave plate for separating and/or directing the two recovered linearly polarized beams.

Another aspect of the application is directed to a method of comparing the quality of received beams at an optical terminal. The beams can be assessed on a packet-by-packet basis. Based on the assessment, the best packet is selected. By so doing, the originally transmitted data stream can be reconstructed.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF THE DRAWINGS

To facilitate a fuller understanding of the invention, reference is now made to the accompanying drawings, in which like elements are referenced with like numerals. These drawings should not be construed as limiting the invention and intended only to be illustrative.

DETAILED DESCRIPTION

Figure 1:
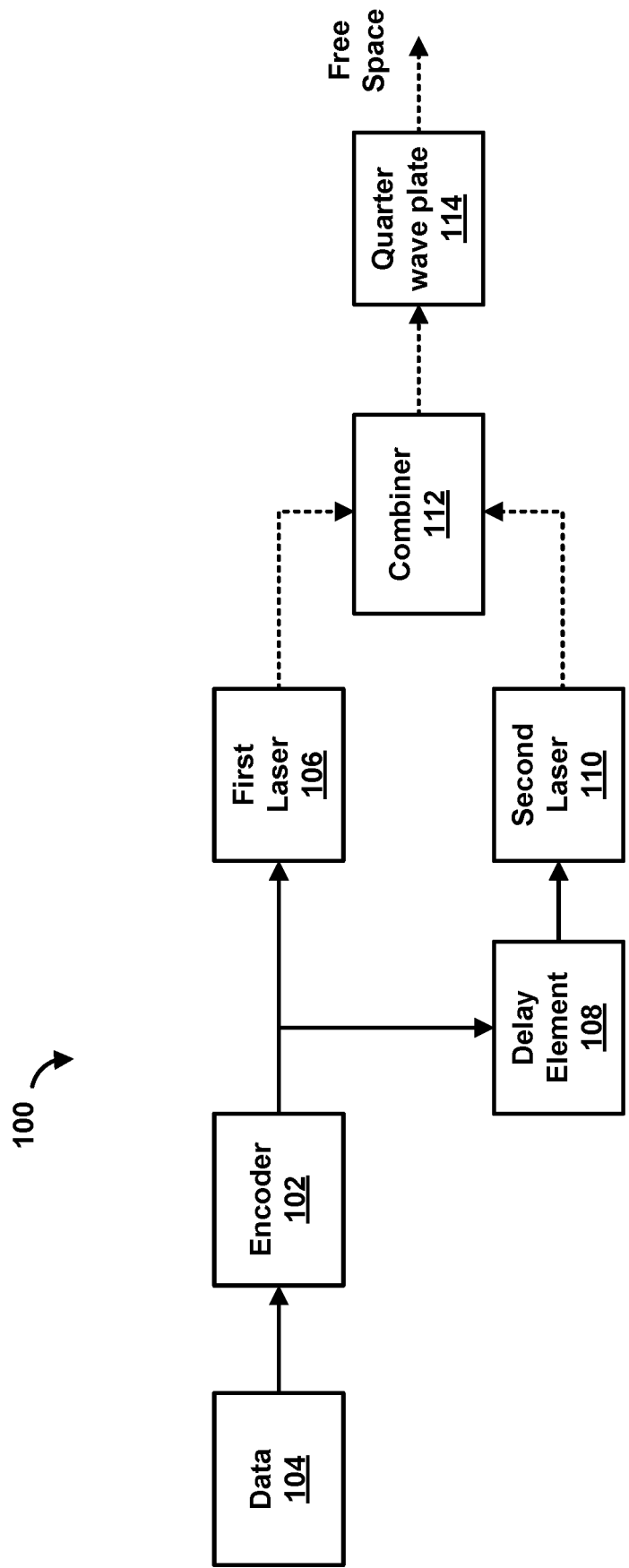
FIG. 1 illustrates an exemplary transmitter according to an aspect of the application.

In this respect, before explaining at least one embodiment of the invention in detail, it is to be understood that the invention is not limited in its application to the details of construction and to the arrangements of the components set forth in the following description or illustrated in the drawings. The invention is capable of embodiments or embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not by other embodiments.

The present disclosure describes a laser communication system, terminal, and method of communication. The laser communication system can comprise a direct-to-earth (DTE) laser communication system. In particular, the DTE laser communication system can comprise an optical terminal configured to mitigate atmospheric scintillation effects.

The architecture exhibits characteristics including but not limited to data redundancy and temporal diversity, separate data channels on same wavelength, separate data channels orthogonally polarized, a circularly polarized transmit beam, separated data channels detected by individual photodetectors (e.g., APDs), and detector outputs processed (e.g., by FPGA) to determine transmitted data, or a combination thereof.

FIG. 1 illustrates an example transmitter 100 in accordance with the present disclosure. The transmitter 100 can be part of a free space optical communication system. The system can comprise the transmitter 100 and the receiver 116 shown in FIG. 2 and described further herein. The transmitter 100 can be configured to transmit a free space signal (e.g., free space optical beam). The free space signal can be transmitted via an atmosphere, such as transmission from space to a planet with an atmosphere, and/or vice versa. The transmitter 100 can be configured to transmit the signal such that effects due to scintillation and/or other atmospheric effects are minimized (e.g., decreased).

The transmitter 100 can comprise an encoder 102. The encoder 102 can be configured to receive and encode data 104. The encoder 104 can be configured to encode the data 104 by converting the data to a bit stream. The encoder 104 can convert the data into a plurality of blocks, segments, data chunks, data portions, packets, and/or the like. The encoder 104 can be configured to encode the data using forward error correction. The encoder 104 can addition information, such as redundant bits, bits used for error correction, bits used to verify data, and/or the like. As an example, the encoder 104 can be configured to apply forward error correction based on one or more standards (e.g., or algorithms thereof), such the International Telecommunications Union (ITU-T) G.709 standard, Reed-Solomon code RS (255, 239), a combination thereof, and/or the like.

The transmitter 100 can be configured to generate (e.g., splitting/copying the encoded data into) two separate data streams, such as a first data stream and a second data streams, based on the encoded data. The separate data streams can be the same. The first data stream can be supplied to a first laser 106. The second data stream can be supplied to a delay element 108. The delay element 108 can be configured to introduce a delay in the second data stream relative to the first data stream. The delay can be a delay for a time period. The delayed second data stream can be supplied to a second laser 110. The time period can be of a time length that allows correction of transmission errors due to atmospheric scintillation. The time period can be of a time length in a range of about 5 ms to about 15 ms. In some implementations, the time period can be dynamically adjusted based on detected changes, such as changes in the atmospheric conditions, changes in interference, changes in signal intensity, and/or the like.

The first laser 106 can be configured to modulate the first data stream into a first optical signal. The first optical signal can comprise the data 104. The first optical signal can comprise a free space optical signal. The second laser 110 can be configured to modulate the second data stream into a second optical signal. The second optical signal can comprise the data delayed by the time period. The second optical signal can comprise a free space optical signal. The first optical signal and the second optical signal can be modulated at the same wavelength (e.g., or different wavelengths). The first optical signal can be linearly polarized by the first laser 106. The second optical signal can be linearly polarized by the second laser 110.

The transmitter 100 can comprise a combiner 112. The combiner 112 can be optically coupled (e.g., via one or more optical fibers) with the first laser 106 and the second laser 110. The combiner 112 can be configured to combine the first optical signal and the second optical signal into a combined optical signal. The combined optical signal can comprise the first optical signal as a sub-channel and the second optical signal as another sub-channel. The combined optical signal can comprise a linearly polarized signal. The combiner 112 can comprise a polarization maintaining combiner. The combiner 112 can be configured to rotate the polarization of one of the first optical signal or the second optical signal 90 degrees. The combined optical signal can comprise the first optical signal with a polarization rotated 90 degrees from the polarization of the second optical signal as output by the combiner. The first optical signal can be rotated, in comparison to the second optical signal, 90 degrees along a direction transverse to a direction of travel of the first optical signal and second optical signal. The combined optical signal be output into free space.

The transmitter 100 can comprise a quarter-wave plate 114 (e.g., or other wave plate, wave element). The quarter-wave plate 114 can be optically coupled to (e.g., via a free space path) to the combiner 112. The quarter-wave plate 114 can be configured to convert the combined signal (e.g., combined linearly polarized signal) into a circularly polarized signal. The circularly polarized signal can comprise a circularly polarized first optical signal (e.g., based on the linearly polarized first optical signal). The circularly polarized signal can comprise a circularly polarized second optical signal (e.g., based on the linearly polarized second optical signal). The quarter-wave plate 112 can be configured to output, into free space, the circularly polarized signal.

It should be understood that the transmitter 100 can comprise additional optical elements for communication, as mirrors, lens, steering motors, and/or the like. For example, the transmitter 100 can comprise (e.g., or be in communication with) optical elements that allow the transmitter 100 to perform signal acquisition, alignment, data transmission, and/or the like. Additionally, as shown in FIG. 1 and FIG. 2, optical signals (e.g., in free space, along an optical transmission line) are illustrated using dotted lines, while electrical signals and/or paths are shown in solid lines.

Figure 2:
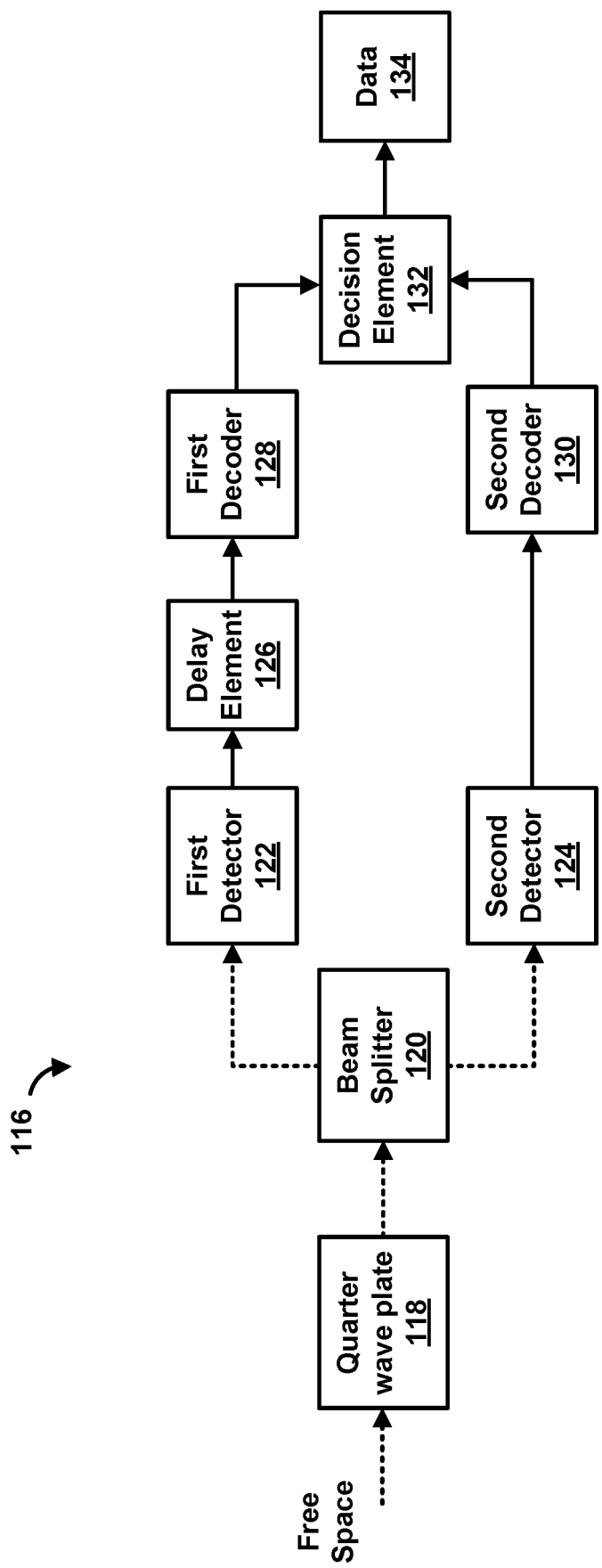
FIG. 2 illustrates an exemplary receiver according to an aspect of the application.

FIG. 2 illustrates an example receiver 116 in accordance with the present disclosure. The receiver 116 can be configured to communicate with the transmitter 100 of FIG. 1. The receiver 116 can be configured to convert an optical signal received from free space into data. The receiver 116 can be configured to convert the optical signal to data such that effects due to scintillation and/or other atmospheric effects are minimized (e.g., decreased).

The receiver 116 can comprise a quarter-wave plate 118. The quarter-wave plate 118 can be configured to receive an optical signal (e.g., optical beam) from free space. The optical signal can comprise circularly polarized optical signal. The quarter-wave plate 118 can be configured to convert the circularly polarized optical signal to a linearly polarized optical signal. The quarter-wave plate 118 can be configured to output the linearly polarized optical signal. The circularly polarized optical signal can comprise a first sub-channel (e.g., a first linearly polarized signal) comprising data. The circularly polarized optical signal can comprise a second sub-channel (e.g., a second linearly polarized signal) comprising the data delayed based on a time period. The time period can be of a time length that allows correction of transmission errors due to atmospheric scintillation. The time period can be of a time length in a range of about 5 ms to about 15 ms.

The receiver 116 can comprise a beam splitter 120. The beam splitter 120 can comprise a polarization beam splitter. The beam splitter 120 can be optically coupled to the quarter-wave plate 118 (e.g., via a free space optical path). The beam splitter 120 can be configured to receive the linearly polarized optical signal and output a first optical signal comprising data and a second optical signal comprising the data delayed by a time period.

The receiver 116 can comprise at least two photodetectors, such as a first photodetector 122 and a second photodetector 124. The at least two photodetectors can comprise one or more avalanche photodiodes. The first photodetector 122 can be configured to convert the first optical signal to a first data signal. The first photodetector 122 can be configured to output the first data signal. The second photodetector 124 can be configured to convert the second optical signal to a second data signal. The second photodetector 124 can be configured to output the second data signal.

The receiver 116 can comprise a delay element 126. The delay element 126 can be communicatively coupled (e.g., electrically coupled) to the first photodetector 122. The delay element 126 can be configured to receive the first data signal. The delay element 126 can be configured to cause the first data signal to be delayed based on the time period. The delay element 126 can be configured to remove the relative delay between the first data signal and the second data signal. For example, the second data signal can comprise data delayed by the time period with respect to the first data signal. The delay element 126 can cause the same or similar delay in the first data signal to remove a difference in delay between the first data signal and the second data signal.

The receiver 116 can comprise at least two decoders, such as a first decoder 128 and a second decoder 130. The at least two decoders can comprise forward error correction decoders. The first decoder 128 can be configured to convert the first data signal to first data. The second decoder 130 can be configured to convert the second data signal to second data. The first data signal and/or the second data signal can comprise addition information (e.g., added by the encoder 102 for forward error correction), such as redundant bits, bits used for error correction, bits used to verify data, and/or the like. at least two decoders can use can. As an example, the at least two decoders can be configured to apply forward error correction based on one or more standards (e.g., or algorithms thereof), such the International Telecommunications Union (ITU-T) G.709 standard, Reed-Solomon code RS (255, 239), a combination thereof, and/or the like.

The receiver 116 can comprise a decision element 132. The decision element can be implemented by one or more circuit elements, a controller, a field programmable gate array (FGPA), a processor, or a combination thereof. The decision element 132 can be configured to receive the first data and the second data. The decision element 132 can be configured to output the data 134. The data 134 can comprise the first data, the second data, or a combination thereof. The decision element 132 can be configured to output the data 134 based on a determination of which of the second data or the first data has fewer errors. The data with fewer errors can be output as the data 134. The data can be analyzed a data block, segment, and/or packet basis. The decision element 132 can be configured to determine, on a packet-by-packet basis, to output the one of the first data or the second data (e.g., or a combination thereof). Each data block, segment, and/or packet can be analyzed separately.

The decision element 132 can be configured to receive first decoding information from the first decoder 128. The first decoding information can indicate one or more of error information (e.g., error rate), probability information (e.g., or likelihood of errors, likelihood of correctness), statistical information, noise information, and/or any other information used in decoding the first data. The decision element 132 can be configured to receive second decoding information from the second decoder 130. The second decoding information can indicate one or more of error information (e.g., error rate), probability information (e.g., or likelihood of errors, likelihood of correctness), statistical information, and/or any other data used in decoding the second data. The decision element 132 can compare (e.g., or otherwise analyze) the first decoding information to the second decoding information. If the comparison indicates that the first data is likely to be more accurate than the second data, then the decision element can select the first data as the data 134. If the comparison indicates that the second data is likely to be more accurate than the first data, then the decision element can select the second data as the data 134.

In some implementations, the transmitter 100 of FIG. 1 and/or the receiver 116 of FIG. 2 can comprise one or more controllers. The one or more controllers can comprise a delay controller configured to control the time period of delay caused by the corresponding delay elements 108, 126. The delay controller can be integrated in the delay element 108, 126 or can be a separate controller. The delay controller can be configured to update a parameter to cause a change in the time period. The delay controller can be configured to update the parameter based on a plurality of measurements of optical intensity over time.

Figure 3:
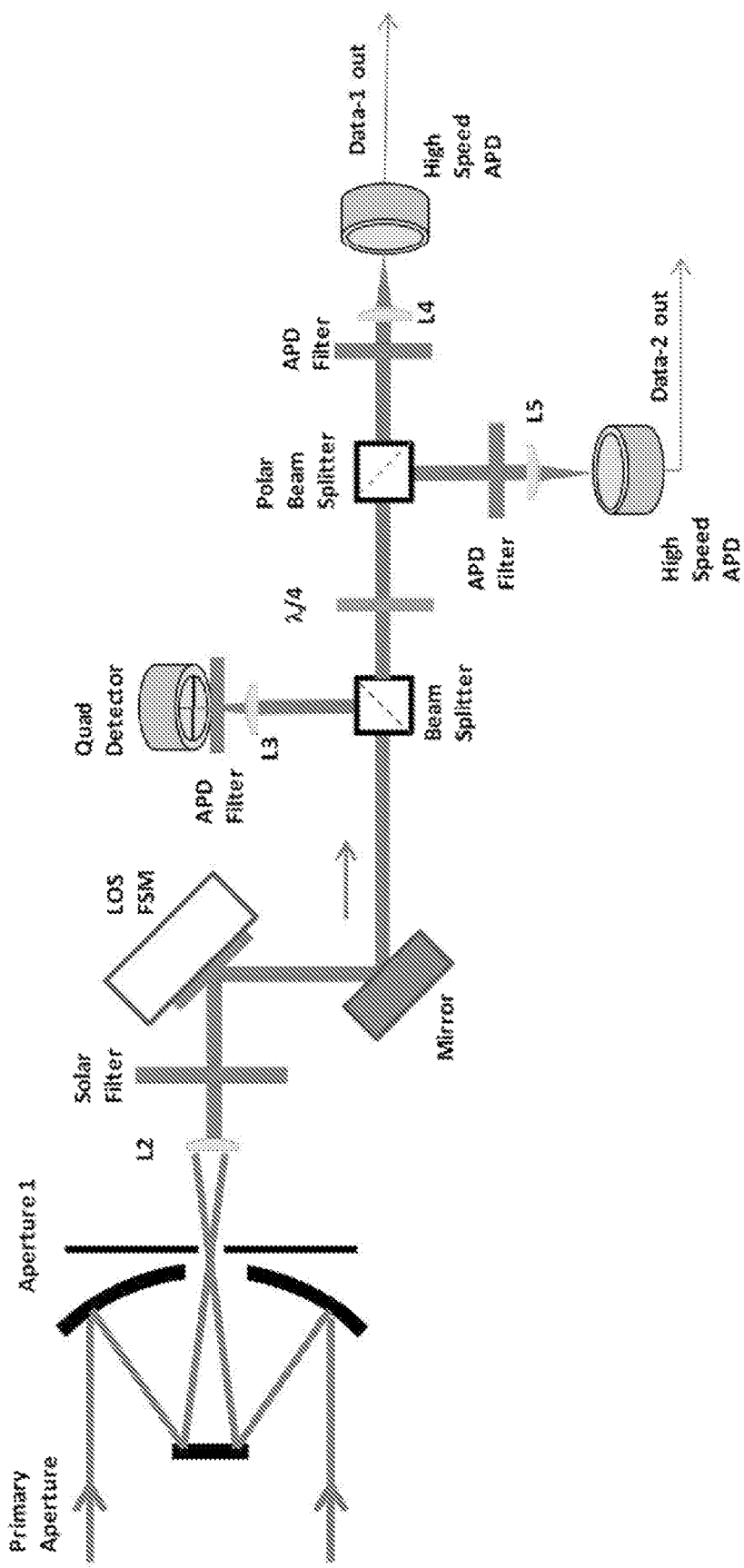
FIG. 3 illustrates an exemplary optical terminal according to an aspect of the application.

FIG. 3 is diagram showing an optical terminal of an example implementation of the receiver of FIG. 2. The optical terminal can comprise one or more apertures (e.g., primary aperture, aperture 1), one or more lenses (e.g., L1, L2, L3, L4, L5), one or more filters (e.g., solar filter, APD filters), detectors (e.g., quad detector, data detectors), mirrors (e.g., line of sight fine steering mirror), a quarter-wave plate, a beam splitter (e.g., beam splitter, polarization beam splitter), a combination thereof, and/or the like. A beam splitter can be used to supply at least a portion of an optical signal to the quad detector to allow for alignment of the receiver with the transmitter. An additional beam splitter can split the remaining portion of the optical signal to two data detectors.

The optical terminal can be configured to support at least a 25 Mb/s downlink speed. The optical terminal can comprise a reflector telescope with a 30 cm main aperture. One example includes a Schmidt/Cassegrain reflector telescope. The optical terminal can comprise narrow field of view (NFOV), avalanche photodiode (APD) detector optics, beacon transmitters and WFOV optics. The optical terminal can comprise a primary aperture and gimbal mechanism. The optical ground terminal may incorporate payload for line of sight (LOS) closed loop spatial tracking.

The optical terminal can incorporate payload for polarization-based temporal diversity. Orthogonal polarizations can be used to carry the same data with relative delay between data carried in polarization as compared to another. Generally, the delay between orthogonal data channels can be greater than the delay caused by the atmosphere (e.g., due to atmospheric scintillation). The coherence time (e.g., about 10 msec) can be selected to ensure uncorrelated atmospheric fades between identical data packets on orthogonal channels.

The optical terminal can compare (e.g., using an FPGA) received data packets between orthogonal channels. Subsequently, the optical terminal can select the best packets to reconstruct original data channels. The receive aperture can collect both orthogonal data streams. The polarizing beam splitter can separate individual data streams onto separate APD detectors. The communication system can comprise a circular polarizer on the transmitter (LEO terminal).

Figure 4:
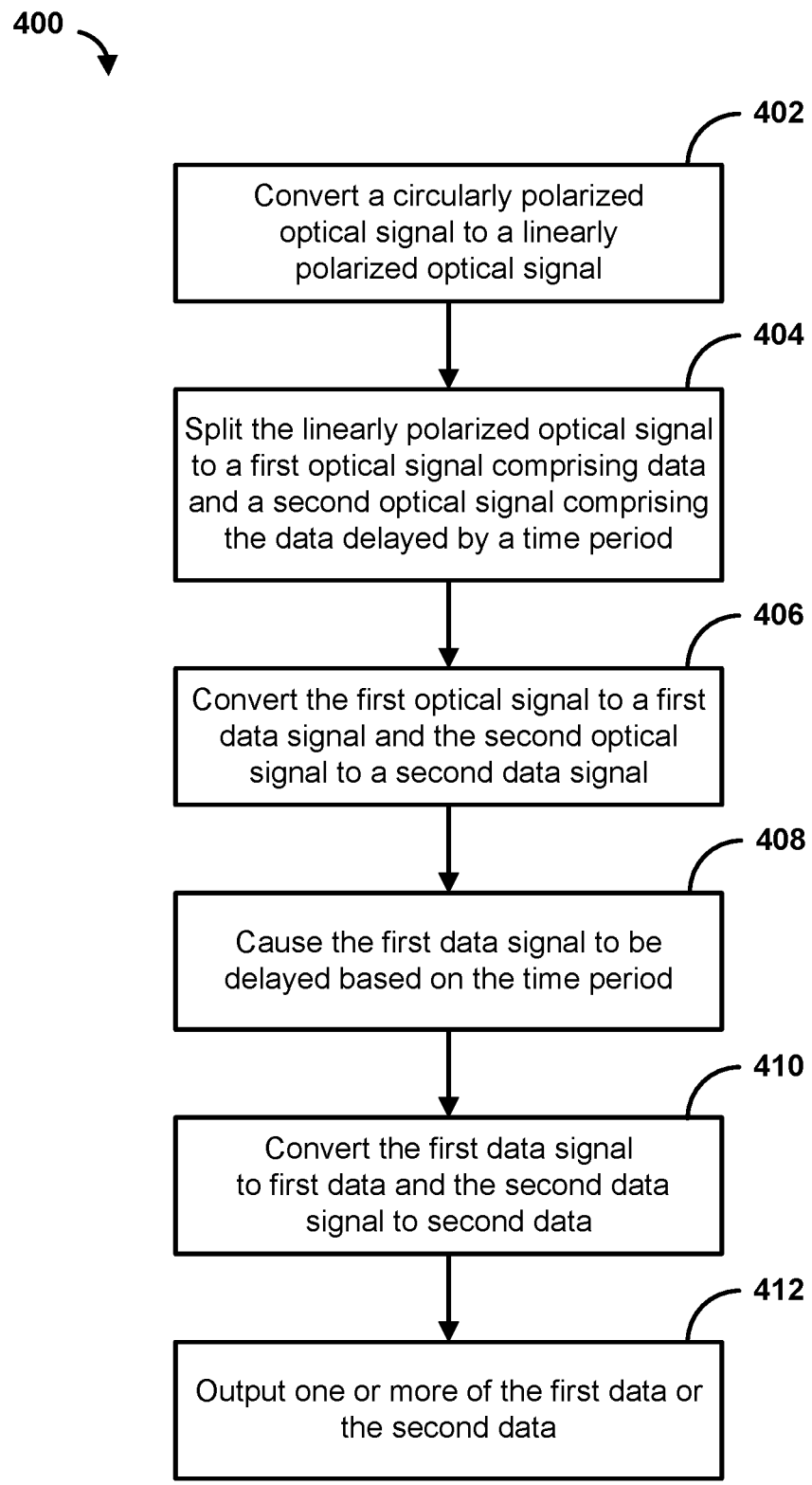
FIG. 4 illustrates an exemplary method for transmitting data according to an aspect of the application.

FIG. 4 illustrates an example method 400 for transmitting data. The method may allow of mitigation (e.g., reduction) of transmission errors due to scintillation. At step 402, a circularly polarized optical signal can be converted to a linearly polarized optical signal. The circularly polarized optical signal can comprise a first sub-channel comprising the data and a second sub-channel comprising the data delayed based on the time period. The circularly polarized optical signal can be received by a receiver from a transmitter. The circularly polarized optical signal can be transmitted through an atmosphere. The atmosphere may distort portions of circularly polarized optical signal. The receiver can be located within the atmosphere (e.g., on land, on a planet). The transmitter can be outside of the atmosphere.

At step 404, the linearly polarized optical signal can be split to a first optical signal comprising data and a second optical signal comprising the data delayed by a time period. The time period can be of a time length that allows correction of transmission errors due to atmospheric scintillation. The time period can be of a time length in a range of about 5 ms to about 15 ms. The time period of delay can be introduced by the transmitter (e.g., to mitigate the effects of scintillation).

At step 406, the first optical signal can be converted to a first data signal and the second optical signal to a second data signal. The first optical signal can be converted to the first data signal using a photodetector. The second optical signal can be converted to the second data signal using another photodetector.

At step 408, the first data signal can be caused to be delayed based on the time period. Delay of the first data signal can result in the first data signal and the second data signal having no delay (e.g., or substantially no delay) relative to each other.

At step 410, the first data signal can be converted to first data and the second data signal can be converted to second data. The first data signal can be converted to first data using a decoder, such as a forward error correction decoder. The second data signal can be converted to the second data using another decoder, such as a forward error correction decoder.

At step 412, one or more of the first data or the second data can be output. One or more of the first data or the second data can be output based on analysis of the first data and the second data. The analysis of the first data and the second data can comprise a determination of which of the second data or the first data has fewer errors. The analysis can be performed on a packet-by-packet bases. The outputting, based analysis of the first data and the second data, the first data or the second data can be performed on a packet-by-packet basis.

The method can further comprise determining a plurality of measurements of optical intensity over time. A parameter can be updated to cause a change in the time period based on the plurality of measurements of optical intensity.

Figure 5:
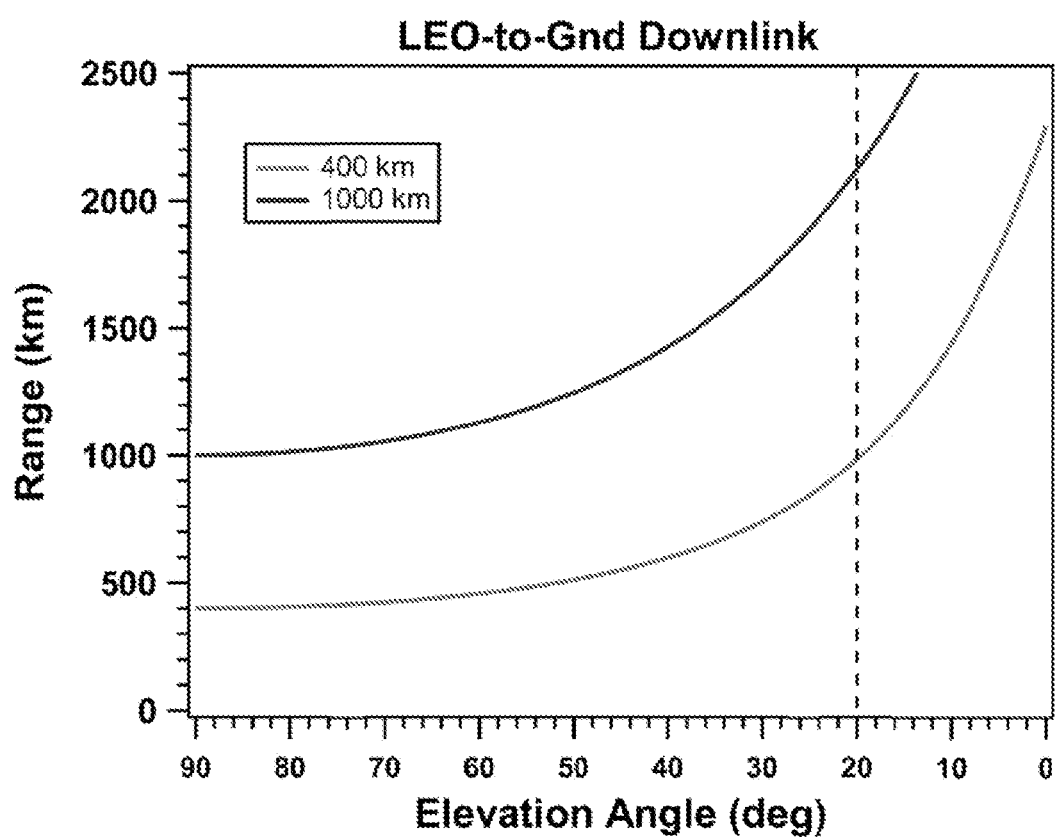
FIG. 5 illustrates a plot of LEO ground to earth characteristics observing range versus elevation angle according to an aspect of the application.

According to another aspect of the application, a method for testing the communication system is performed in a SV-Ground state. In particular, FIG. 5 illustrates characteristics of LEO to ground downlink. The elevation angle in degrees is provided on the x-axis. The range in kilometers is provided on the y-axis. FIG. 5 illustrates data for elevations beginning at 400 and 1000 km respectively. From the data, it has been determined the range varies with elevation angle. Moreover, atmospheric loss (absorption/scattering) varies with elevation angle. Further, atmospheric scintillation loss varies with elevation angle.

Figure 6A:
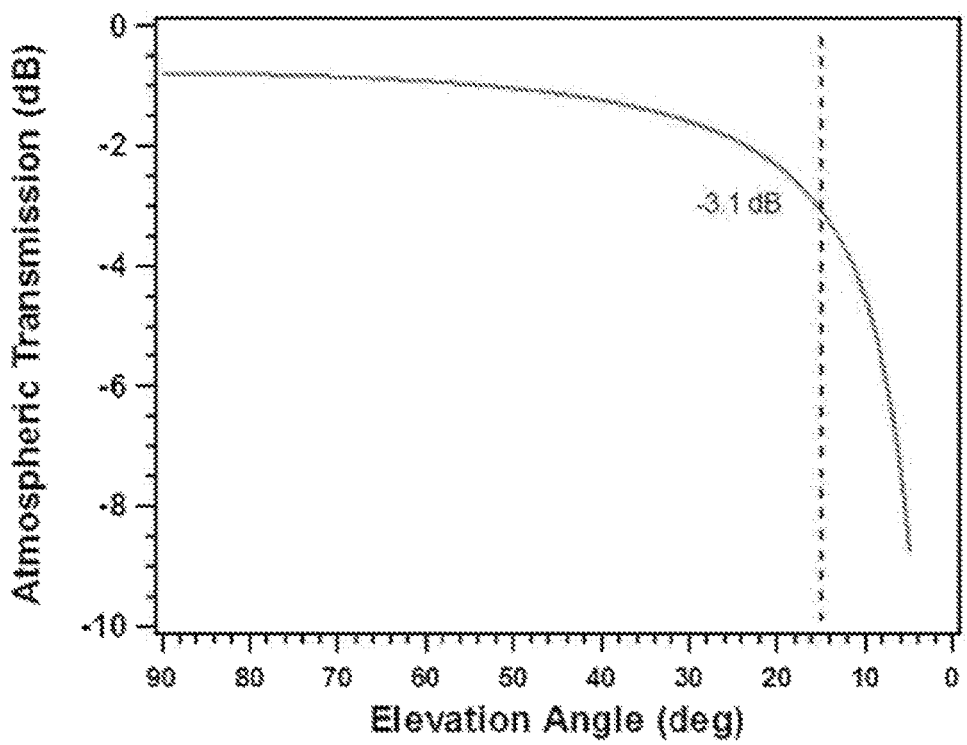
FIGS. 6A and 6B illustrate a plot of LEO to ground link observing atmospheric loss versus elevation angle and scintillation index versus elevation angle, respectively, according to an aspect of the application.
Figure 6B:
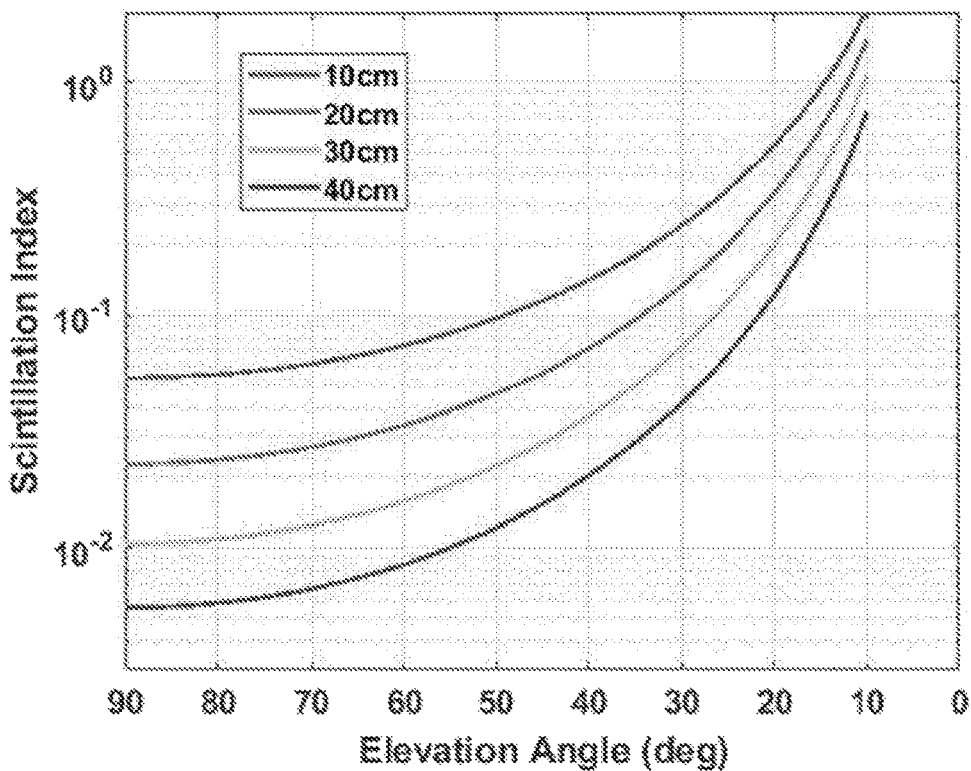

FIGS. 6A and 6B illustrate a plot of LEO to ground (LEOG) link observing atmospheric loss and scintillation index versus elevation angle, respectively. The calculations are performed at sea level with nominal atmospherics ($C_n^2=1.7\times10^{-14}$ m$^{2/3}$). The data is shown for 1550 nm. In FIG. 6A, with atmospheric transmission (dB) plotted against elevation angle (deg), an atmospheric transmission of –3.1 dB is observed at about 15 degrees.

In FIG. 6B, the scintillation index is observed at 10 cm, 20 cm, 30 cm and 40 cm. Each of the elevation angles originates at 90 degrees and reaches a final destination of about 10 degrees. The scintillation index at 10 cm and 20 cm, respectively, fell between 10-1 and 10-2. Meanwhile, the scintillation index at 30 and 40 cm fell below 10-2. From the data, it has been determined that atmospheric characteristics rapidly degrade at lower elevation angles.

Figure 7A:
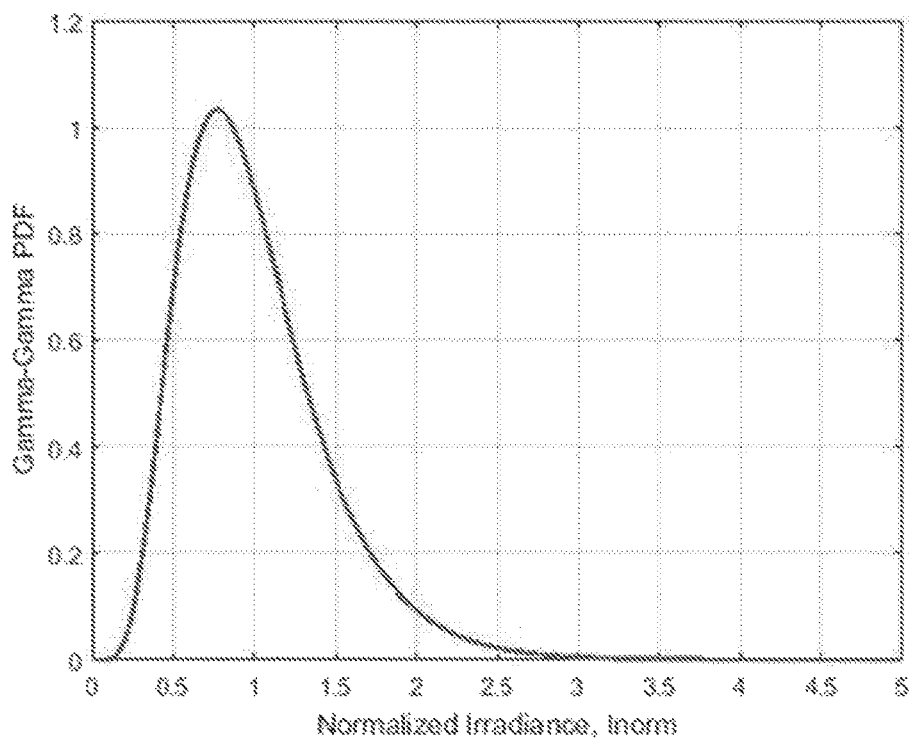
FIGS. 7A and 7B illustrate plots of the communication system in SV-ground state at zenith according to an aspect of the application.
Figure 7B:
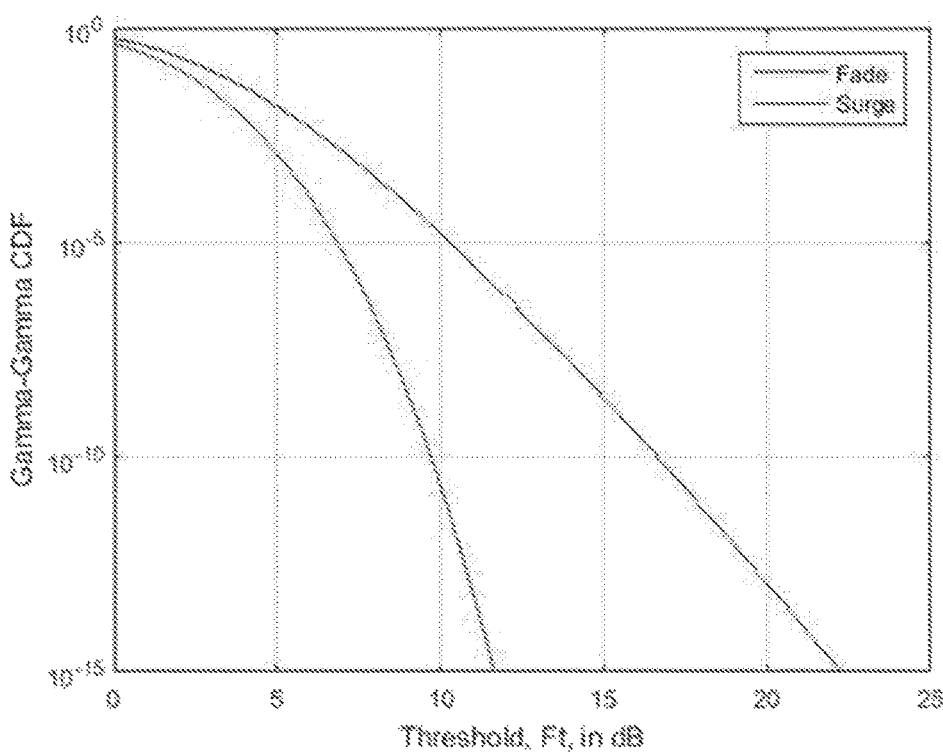

FIGS. 7A and 7B illustrate plots of the communication system in SV-ground state. Characteristics of scintillation versus elevation angle are observed. Here, the calculation at sea-level with nominal atmospherics is $C_n^2=1.7\times10^{-14}$ m$^{2/3}$. The observed data is for 840 nm, LEO Height of 1000 km, an Rx Aperture of 30 cm. FIG. 7A illustrates a peak normalized irradiance (PDF) between 0.5 and 1 at a Gamma-Gamma of about 1 for zenith. Thereafter, the gamma-gamma stabilizes toward zero beginning at a normalized radiance of about 2.5-3. FIG. 7B illustrates a fade between 20-25 dB and a surge probability between 10-15 at $10^{-15}$ Gamma-Gamma for zenith.

FIG. 7A represents a Probability Density Function for the Normalized Received optical power. This figure shows a statistical distribution of light collected by the receive aperture on the Ground station. FIG. 7B is the related Cumulative Probability Distribution Function of Received optical power. This figure shows a Fade/Surge probability in the received optical power. The analysis shown in FIGS. 7A-B is for the case of 90-degree elevation angle, where the transmitting satellite is directly overhead the Ground station.

Figure 8A:
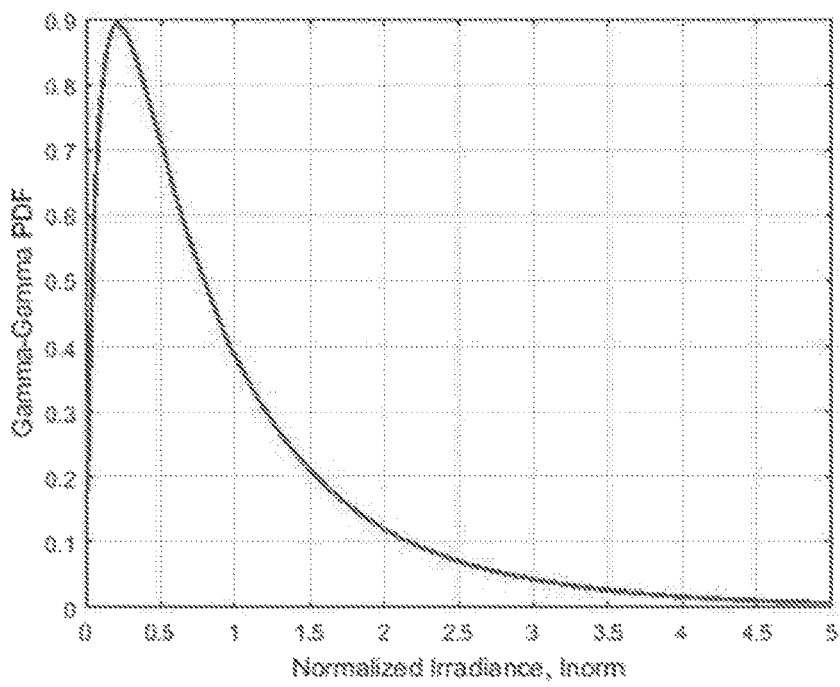
FIGS. 8A and 8B illustrate plots of the communication system in SV-ground state at a 20-degree elevation according to an aspect of the application.
Figure 8B:
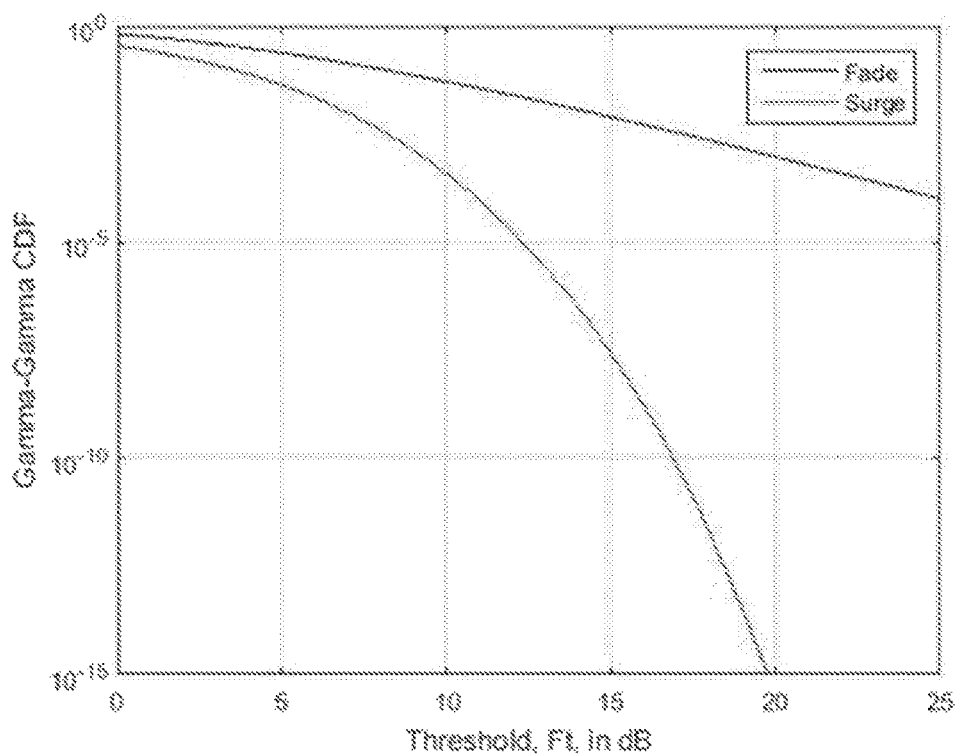

FIGS. 8A and 8B illustrate plots of the communication system in SV-ground state. Similar characteristics described above in FIGS. 7A and 7B are observed in FIGS. 8A and 8B, albeit at a 20-degree elevation. FIG. 8A illustrates a peak normalized irradiance (PDF) between 0.5 and 1 at a Gamma-Gamma of about 1 for a 20-degree elevation. Thereafter, the Gamma-Gamma stabilizes toward zero beginning at a normalized radiance of about 4-5. FIG. 8B illustrates a fade of 25 at a Gamma-Gamma of about $10^{-4}$ to $10^{-5}$, and a surge probability between about 18-20 at $10^{-15}$ for a 20-degree elevation.

FIG. 8A represents a Probability Density Function for the Normalized Received optical power. This figure shows a statistical distribution of light collected by the receive aperture on the Ground station. FIG. 8B is the related Cumulative Probability Distribution Function of Received optical power. This figure shows a Fade/Surge probability in the received optical power. The analysis shown in FIGS. 8A-B is for the case of 20-degree elevation angle.

The purpose of including FIGS. 7A-B and 8A-B is to illustrate the random, statistical nature of the received light, after propagating through the atmosphere. This scintillation induced received optical power fluctuation is an inescapable result of propagating though the atmosphere. The present disclosure proposes a novel method of mitigating this impairment using temporal diversity in orthogonally polarized redundant data streams.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A system for free space communication comprising:
   a transmitter configured to output, into free space, a circularly polarized signal; and
   a receiver configured to:
      convert the circularly polarized signal received via free space to a linearly polarized optical signal;
      split the linearly polarized optical signal to a first optical signal comprising data and a second optical signal comprising the data delayed by a time period;
      convert the first optical signal to a first data signal and the second optical signal to a second data signal;
      cause the first data signal to be delayed based on the time period;
      convert the first data signal to first data and the second data signal to second data; and
      output, based on analysis of the first data and the second data, the first data or the second data.

2. The system of claim 1, wherein the analysis of the first data and the second data comprises a determination of which of the second data or the first data has fewer errors.

3. The system of claim 1, wherein the receiver is configured to output, based on the analysis of the first data and the second data, the first data or the second data on a packet-by-packet basis.

4. The system of claim 1, wherein the time period is of a time length that allows correction of transmission errors due to atmospheric scintillation.

5. The system of claim 1, wherein the time period is of a time length in a range of about 5 ms to about 15 ms.

6. The system of claim 1, wherein the receiver is further configured to:
   determine a plurality of measurements of optical intensity over time; and
   update a parameter to cause a change in the time period based on the plurality of measurements of optical intensity.

7. The system of claim 1, wherein the circularly polarized signal comprises a first sub-channel comprising the data and a second sub-channel comprising the data delayed based on the time period.

8. A method for free space communication comprising:
   generating a first optical signal comprising data and a second optical signal comprising the data delayed by a time period;
   combining the first optical signal and the second optical signal into a combined linearly polarized signal;
   converting the combined linearly polarized signal into a circularly polarized signal; and
   outputting, into free space, the circularly polarized signal.

9. The method of claim 8, wherein generating the first optical signal comprising the data and the second optical signal comprising the data delayed by the time period comprises:
   generating a first data stream comprising the data and a second data stream comprising the data;
   causing, using a delay element, a delay of the second data stream;
   outputting, via a first laser and based on modulating the first data stream, the first optical signal; and
   outputting, via a second laser and based on modulating the delayed second data stream, the second optical signal.

10. The method of claim 8, wherein the time period is of a time length that allows correction of transmission errors due to atmospheric scintillation.

11. The method of claim 8, wherein combining the first optical signal and the second optical signal comprises rotating a polarization of the first optical signal 90 degrees, in comparison to a polarization of the second optical signal, along a direction transverse to a direction of travel of the first optical signal and the second optical signal.

12. The method of claim 8, further comprising:
receiving, via free space, an additional circularly polarized signal;
splitting the additional circularly polarized signal into two linearly polarized signals;
correcting for a time delay between the two linearly polarized signals based on the time period; and
outputting, based on analysis of additional data from the two linearly polarized signals corrected for the time delay, a portion of the data.

13. The method of claim 12, wherein the analysis of the additional data from the two linearly polarized signals corrected for the time delay comprises a determination of which portion of the additional data has fewer errors.

14. The method of claim 12, further comprising outputting, based on the analysis of the additional data from the two linearly polarized signals corrected for the time delay and on a packet-by-packet basis, a portion of the additional data.

15. A device for free space communication comprising:
a first laser configured to generate a first optical signal comprising data;
a second laser configured to generate a second optical signal comprising the data delayed by a time period;
a combiner configured to combine the first optical signal and the second optical signal into a combined linearly polarized signal; and
a quarter-wave plate configured to convert the combined linearly polarized signal into a circularly polarized signal, wherein the circularly polarized signal is output into free space.

16. The device of claim 15, further comprising:
an encoder configured to generate a first data stream comprising the data and a second data stream comprising the data; and
a delay element configured to cause a delay of the second data stream, wherein the first laser is configured to modulate the first data stream to generate the first optical signal and the second laser is configured to modulate the delayed second data stream to generate the second optical signal delayed by the time period.

17. The device of claim 15, wherein the time period is of a time length that allows correction of transmission errors due to atmospheric scintillation.

18. The device of claim 15, wherein the combiner is configured to rotate a polarization of the first optical signal 90 degrees, in comparison to a polarization of the second optical signal, along a direction transverse to a direction of travel of the first optical signal and the second optical signal.

19. The device of claim 18, further comprising:
an additional quarter-wave plate configured to output, based on an additional circularly polarized signal received from free space, an additional linearly polarized optical signal;
a polarization beam splitter configured to receive the additional linearly polarized optical signal and output two additional linearly polarized optical signals;
a delay element configured to correct for a time delay between the two additional linearly polarized optical signals based on the time period; and
a decision element configured to output, based on analysis of additional data from the two additional linearly polarized optical signals corrected for the time delay, a portion of the additional data.

20. The device of claim 19, wherein the analysis of the additional data from the two additional linearly polarized optical signals corrected for the time delay comprises a determination of which portion of the additional data has fewer errors.

* * * * *